United States Patent [19]
Dauenhauer et al.

[11] Patent Number: 5,132,658
[45] Date of Patent: Jul. 21, 1992

[54] MICROMACHINED SILICON POTENTIOMETER RESPONSIVE TO PRESSURE

[75] Inventors: Dennis A. Dauenhauer, San Jose; Hans Reimann, Sunnyvale, both of Calif.

[73] Assignee: Sensym, Inc., Sunnyvale, Calif.

[21] Appl. No.: 511,656

[22] Filed: Apr. 19, 1990

[51] Int. Cl.⁵ .................. H01C 10/06; H01C 10/10
[52] U.S. Cl. ............................. 338/92; 338/47; 338/42
[58] Field of Search .............. 338/47, 78, 92, 99, 338/97, 105, 114, 120, 42; 73/719, 862.68; 200/5 A, 83 N

[56] References Cited

U.S. PATENT DOCUMENTS

| | | | |
|---|---|---|---|
| 3,093,806 | 6/1963 | Gutterman | 338/42 |
| 3,174,125 | 3/1965 | Curby | 338/47 |
| 3,418,850 | 12/1968 | Goddin | 338/97 X |
| 4,079,351 | 3/1978 | Levine | 338/36 |
| 4,479,392 | 10/1984 | Froeb et al. | 73/862.68 |
| 4,543,457 | 9/1985 | Petersen et al. | 200/83 N |
| 4,555,954 | 12/1985 | Kim | 338/47 X |
| 4,722,348 | 2/1988 | Ligtenberg et al. | 128/675 |

*Primary Examiner*—Marvin M. Lateef
*Attorney, Agent, or Firm*—Skjerven, Morrill, MacPherson, Franklin & Friel

[57] ABSTRACT

A silicon pressure chip operates in a two-wire resistive mode. A thin-film resistor located on a long silicon beam which is the thicker portion of a thin diaphragm is partially shorted out by a metallized deflection stop. The pressure response of the resistor is determined by the resistor layout.

9 Claims, 5 Drawing Sheets

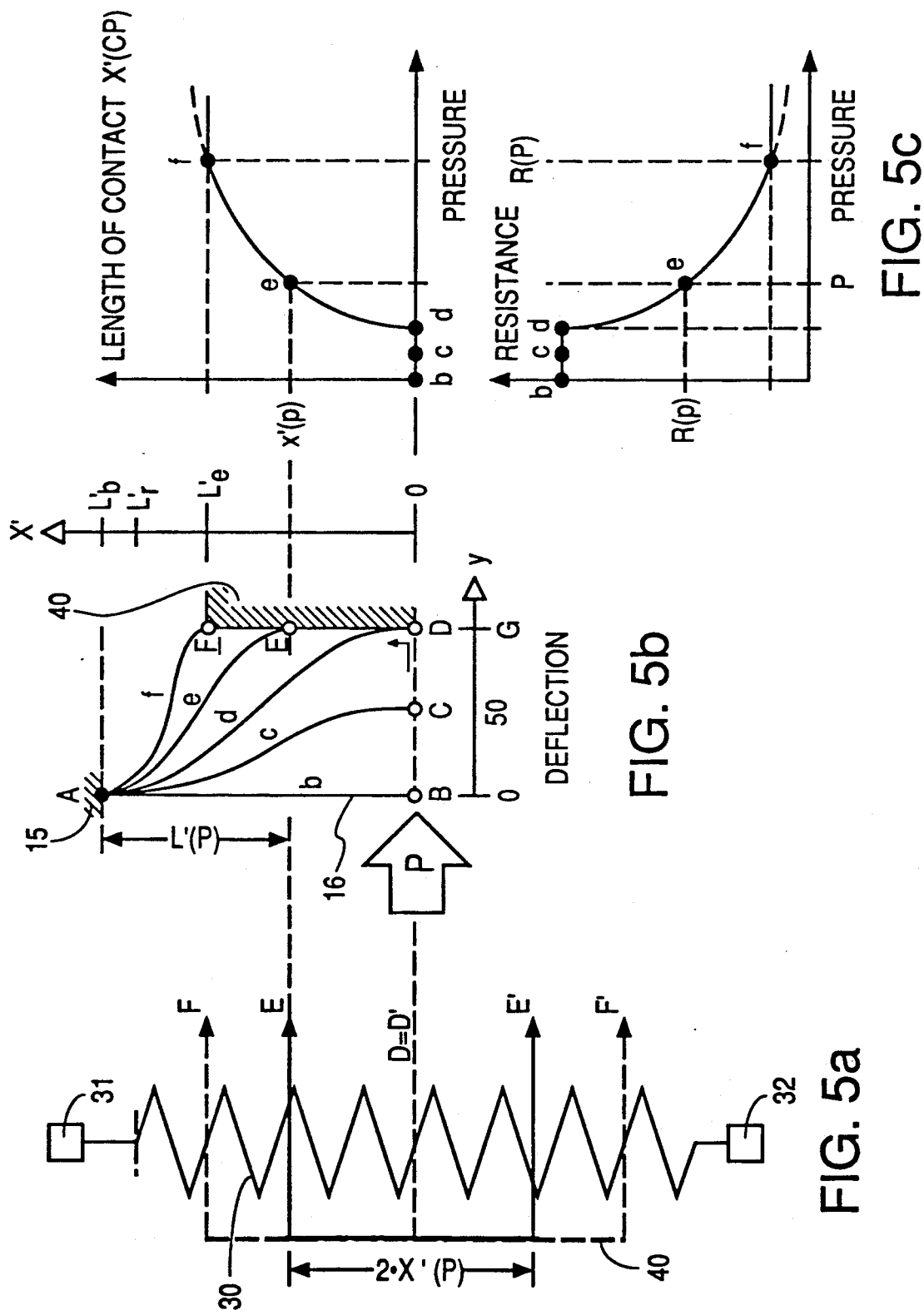

MICROMACHINED SILICON POTENTIOMETER RESPONSIVE TO PRESSURE

BACKGROUND OF THE INVENTION

1. Field of the Invention

This invention relates to a silicon pressure sensor chip, and more specifically to such a chip operating in a two wire resistive mode.

2. Description of the Prior Art

Silicon pressure sensor chips are well known in the art. Typical prior art sensor chips operate in the differential voltage mode. A piezo-resistive sensing element in the form of a Wheatstone bridge (four individual resistors) or a four terminal resistor (shear element), placed on a thin silicon diaphragm, yields a small output voltage of typically 20 mV/V full scale. This is the result of the piezo-resistive effect, which amounts to only a few percent of the resistance of the sensing element. A pressure sensor in the resistive mode requires a resistance change of up to 100 percent.

U.S. Pat. No. 4,079,351 issued Mar. 14, 1978 to Levine describes a pressure responsive sender whose electrical resistance varies in response to applied pressure. To achieve this function, a complex mechanical assembly of many parts is included. The pressure exerted by a medium in a pressure chamber deflects a diaphragm which moves a push member. This leads to a pivotal movement of a contact assembly around a knife edge and against the restoring force of a spring. The contacts engage the coil of a resistor assembly resulting in a decrease of the resistance with increasing pressure.

Several issues affecting manufacturing and reliability are addressed in the above disclosure. First, there is the problem of pressure hysteresis. Identical pressures will not produce an identical resistance after repeated pressure cycling due to the mechanical assembly with its bearings, friction and slip. Second, there is the problem of volume production and its associated cost when handling one device at a time. Also, there is the difficulty of precise calibration.

U.S. Pat. No. 4,543,457, issued Sep. 24, 1985 to Petersen et al. describes a microminiature pressure sensitive switch (shown in FIG. 1 in partial cross-section) based on silicon technology. A thin silicon diaphragm 100 is located opposite a metallized glass plate 102 and in response to an externally applied pressure diaphragm 100 bulges in the direction of glass plate 102 and makes contact with glass plate 102 at a well defined pressure. With increasing pressure, the contact area spreads out in the radial direction. At predetermined locations on the silicon diaphragm 100, there are button-like elevations 106 which define an electrical contact across the gap between silicon surface 100 and the surface of glass plate 102. These electrical contacts 106 are used as a switch for digitizing or monitoring a threshold level of an external pressure.

U.S Pat. No. 4,722,348, issued Feb. 2, 1988 to Ligtenberg et al., shows a silicon chip for a catheter tip pressure transducer have a rectangular diaphragm modified by the etching of two rectangular recess areas. This approximates a longitudinal beam, clamped at both ends, and loaded with a uniform pressure. The design has a small cross section, as necessary for a chip mounted inside a catheter with a small diameter.

SUMMARY OF THE INVENTION

One object of this invention is to provide a micromechanical device formed on a silicon wafer for a reliable low cost version of the pressure sender described above. Silicon technology offers two key advantages. First, it is a batch process with its inherent cost advantage. Typically, several hundred devices are laid out on a silicon wafer and are processed together. Second, silicon as a mechanical material has the elastic properties and the strength to replace a mechanism consisting of flexures and springs with a monolithic structure that does not show the creep and hysteresis of a mechanical assembly. Photolithography and anisotropic silicon etching control the dimensions of the structure and the registration between different elements down to the micron level, providing reproduceable characteristics from device to device. In addition, integrated circuit technology allows compensation and calibration (e.g. laser trimming).

BRIEF DESCRIPTION OF THE DRAWINGS

FIG. 5a-c illustrates the principle of operation and the response of the chip.

Identical reference numbers in different figures denote identical or similar structures.

DETAILED DESCRIPTION OF THE INVENTION

Figure 1:
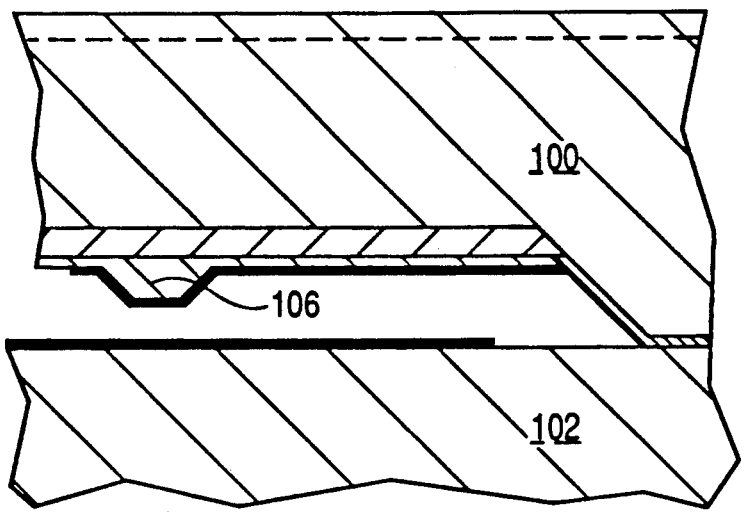
FIG. 1 shows a prior art pressure switch.
Figure 2:
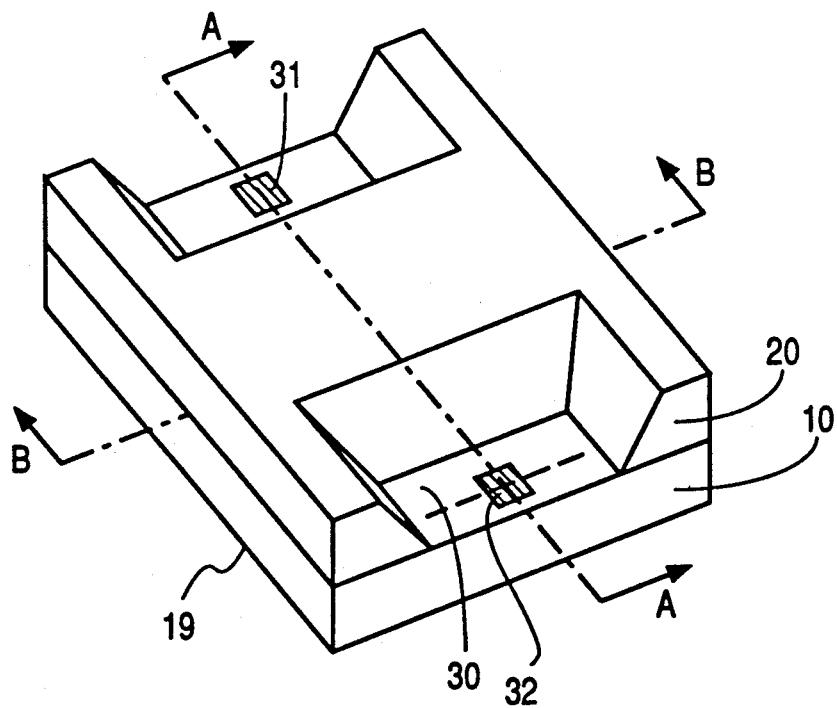
FIG. 2 shows a perspective view of a silicon pressure sender chip in accordance with this invention.

FIG. 2 is a perspective view of a silicon pressure sender in accordance with the invention. It is a sandwich of two silicon chips, a base chip 10 and a cover chip 20. At the center of the device is a resistor 30 with two terminals 31 and 32. Pressure is applied to the backside surface 19 of the chip 10. With increasing pressure the resistance between terminals 31 and 32 decreases from a specified value at zero pressure. Details are shown in the perspective cut-away drawing of FIG. 3 and the cross-sections of FIGS. 4a, 4b respectively along the symmetry axes A—A and B—B of FIG. 2.

A typical chip is rectangular with a length of 3.5 millimeter and width of 2 millimeter yielding about one thousand chips for a wafer with a diameter of 100 millimeter.

The structure of base chip 10 (see FIGS. 3, 4a, 4b) is determined by a cavity 11 etched from the backside 19 and two recessed 12 and 13 etched from the frontside. Cavity 11 defines rectangular diaphragm area 14 at the bottom of cavity 11 and rigid frame 15 around the sides of cavity 11. Diaphragm 14 is built into frame 15 and consists of a thick beam 16 and two thin membranes 17 and 18 along the sides of beam 16. Back surface 19 is the die attach area. A thin dielectric layer 10a covers the front side of base chip 10. Layer 10a isolates deposited thin-film resistor 30 including metal terminal pads 31 and 32 and metal interconnect 33 from the silicon structure.

The structure of cover chip 20 is similar to that of base chip 10. A deep etch through the whole wafer of chip 20 defines windows 21 and 22, and a shallow etch from the other side defines a cavity 23. A metal electrode 40 is deposited on top of a dielectric layer 25.

Base chip 10 and cover chip 20 are bonded together, defining a gap 50 between the surface of thin film resistor 30 and the surface of metal electrode 40. In one embodiment, cavity 23 is conventionally hermetically sealed and evacuated. It is to be understood that in another embodiment, the resistor is the deflection stop against which the electrode deflects under pressure.

In operation, pressure is applied to cavity 11. The resulting pressure difference across diaphragm 14 (applied pressure minus reference pressure in cavity 23) causes beam 16 to bulge upward towards metal electrode 40. At a specified pressure the deflection equals the gap distance, and the surface of metal resistor 30 hits metal electrode 40 on cover wafer 20, which acts as a deflection stop. With increasing pressure the contact area between thin-film resistor 30 and metal electrode 40 spreads out along the axis of beam 16, starting at the center of beam 16. Since the resistance of metal electrode 40 is much lower than that of the thin-film resistor 30, the center portion of resistor 30 is shorted out, and the total resistance between terminals 31 and 32 is reduced.

Thus silicon beam 16 functions as diaphragm, push member, spring and resistor assembly, and the metallized deflection stop 40 provides a wiper electrode for a potentiometer function.

Typical dimensions for the chip described above are a beam 16 length of 2000 microns, a beam 16 thickness of 20 microns, a membrane 17, 18 thickness of 5 microns and a gap 50 of 1 micron.

The fundamental structure of the chip is thus an elastic beam of length L, width W, and thickness T, clamped at both ends and loaded with a pressure P. This structure was chosen for its longitudinally extending deformation. The beam is capable of large deflections, which, however, are prevented by a deflection stop. Typically, the deflection amounts of less than 10 percent of the beam thickness. This makes it possible to bring a large fraction of the beam length into contact with the deflection stop.

The ideal structure is approximated in the disclosed device by a beam-type diaphragm 14, consisting of the desired beam 16, plus thin and very compliant membrane areas 17, 18 to complete the necessary pressure chamber and maintain the pressure difference across beam 16. If the thickness of membrane 14 is small in comparison with the beam 16 thickness, the restoring force from membrane 14 can be neglected. This assumption is made in the following analytical expressions. The necessary beam equations are found in a book by Warren C. Young, "Roark's Formulas for Stress and Strain", published by McGraw-Hill (sixth edition 1989). Due to the symmetry of the structure, it is sufficient to analyze half of the beam, from the clamped end to the guided end at the center. All dimensions related to a half-beam will be written with a prime, e.g. $L=2 L_b'$.

In the first phase, the guided end moves in the normal direction towards the deflection stop. The deflection is proportional to the applied pressure, and at the well-defined gap pressure $P_g$:

$$P_g = 32 \cdot E \cdot T^3 \cdot G / L^4 \qquad \text{(Equation 1)}$$

the deflection at the guided end of the beam is equal to the gap distance G. E is the elastic constant (Young's modulus) of the beam material. The solution does not depend on the beam width W.

With increasing pressure, a portion of the beam rests against the deflection stop and the effective length of the beam, L'(P), is reduced. The guided end of the beam moves along the deflection stop in the longitudinal direction X'. This boundary condition adds a compressive force to the beam equation. The analytical solution has the general form $$X'(P)/L_b' = \text{Function } (P_g/P) \qquad \text{(Equation 2)}$$

FIG. 5 part c shows a typical plot of this function. The pressure sensitivity, $dX'/dP$, is highest at the gap pressure $P_g$ and decreases continuously with increasing pressure.

A longitudinal resistor with an initial value R(0) and a total length $L_r'$ is shorted out over the distance X'(P). This leads to the pressure dependence of the resistance:

$$R(P)/R(0) = 1 - X(P)/L_r' \qquad \text{(Equation 3)}$$

FIG. 5 shows, from left to right, a circuit diagram of the chip (part a), the deflection of the beam (part b) and the pressure response of the device (part c). Elements of the structure are identified with the same reference numbers used in the previous figures. FIG. 5 (part b) shows a side view of beam 16 with clamped end 15 and deflection stop 40 separated by gap 50. Five different beam positions labeled (b), (c), (d), (e) and (f) with the clamped end A and the guided end points B, C, D, E and F are shown. The straight line (b) between the points A and B is the relaxed position of the beam. Line (d) between the points A and D shows the special situation, where, at the pressure $P_g$, center of the beam is in contact with the deflection stop. Beam position (c) with end points A and C is a general position for a pressure smaller than $P_g$ and beam position (e) with end points A and E shows a general case for a pressure larger than $P_g$. In this case, the length X'(P) between the points E and D is in contact with the deflection stop, and the effective length of the beam is reduced to $L'(P) = L_b' - X'(P)$. Beam position (f) with point F shows the limit $X'(P) = L_e'$ where the end of metal electrode 40 is reached. In the general case the length of metal electrode 40, $L_e'$, is different from the resistor 30 length $L_r'$ and the total length of beam 16, $L_b'$.

The length of resistor 30 which is in contact with the deflection stop 40, X'(P), is shown as a function of the applied pressure in the upper plot of FIG. 5 (part c). This portion of resistor 30 is shorted out electrically. FIG. 5 (part a) illustrates the situation using the conventional schematic symbol for the action of metal electrode 40 at the deflection stop. The resistance between terminals 31 and 32 is determined by equation 3 and shown as a function of the pressure in the lower plot of FIG. 5 (part c). Notice the common scale for the vertical direction in FIG. 5 parts a, b, c.

The pressure response of a uniform two terminal resistor is divided into three characteristic regions: (1) for small pressures, $P < P_g$, the resistance is constant; (2) above the gap pressure, $P > P_g$, there is a change of resistance determined by the pressure response of the beam; and (3) for $X'(P) > L_e'$, the pressure dependence is terminated and the resistance value remains constant.

Figure 3:
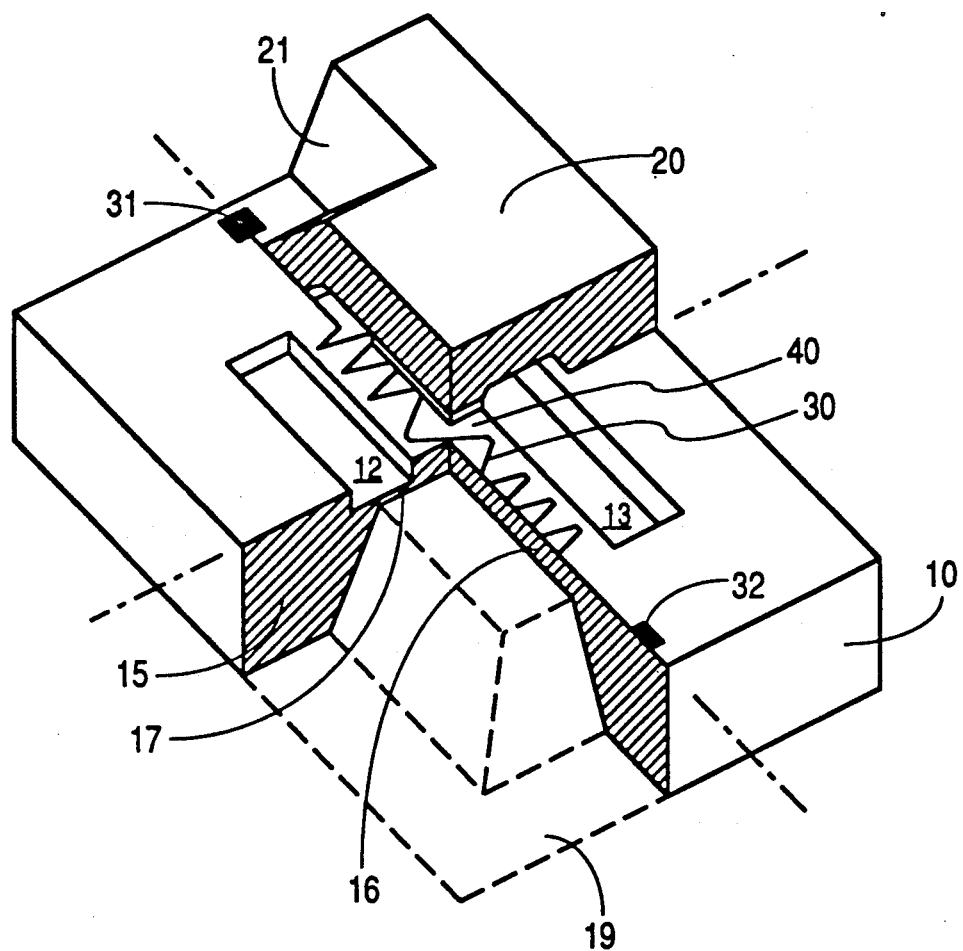
FIG. 3 shows a perspective view of the internal structure of the chip of FIG. 2.
Figure 4A:
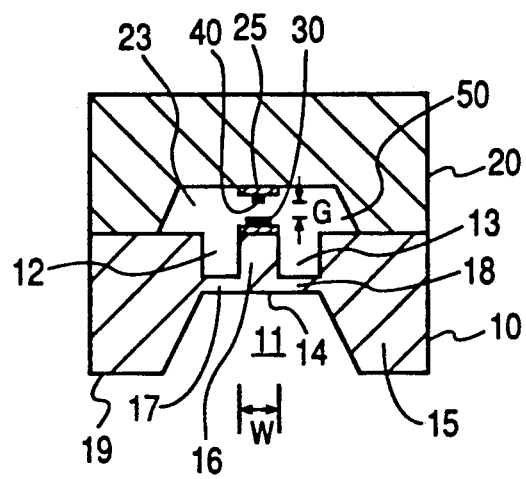
FIGS. 4a and 4b show cross-sections of the chip of FIGS. 2 and 3.
Figure 4B:
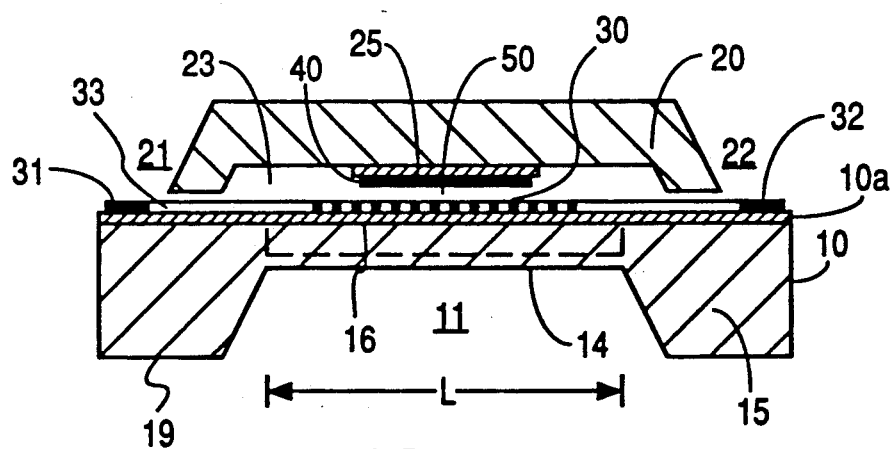

Several techniques can be used to custom design the pressure response for a specific application. Keeping the resistor shorter than the metal electrode allows resistance variations of 100 percent. The first region can be eliminated by designing a beam with a gap pressure lower than the ambient pressure of the pressure medium and evacuating the reference cavity, with the sandwich of the two silicon wafers hermetically sealed. The characteristics of the active central region can be modified through the layout of the resistor. With a locally variable resistance per unit length it is possible to increase or decrease the pressure sensitivity at a given pressure. FIG. 5 (part c) shows the response for a uniform resistor layout and FIG. 3 illustrates the principle of flattening out the initial steep decrease by putting less resistance at the center of beam 16. Finally, it is possible to locally change the moment of inertia of the beam cross-section to further modify the pressure response. These optimizations are performed with conventional finite element analysis of the complete mechanical structure.

Figure 6:
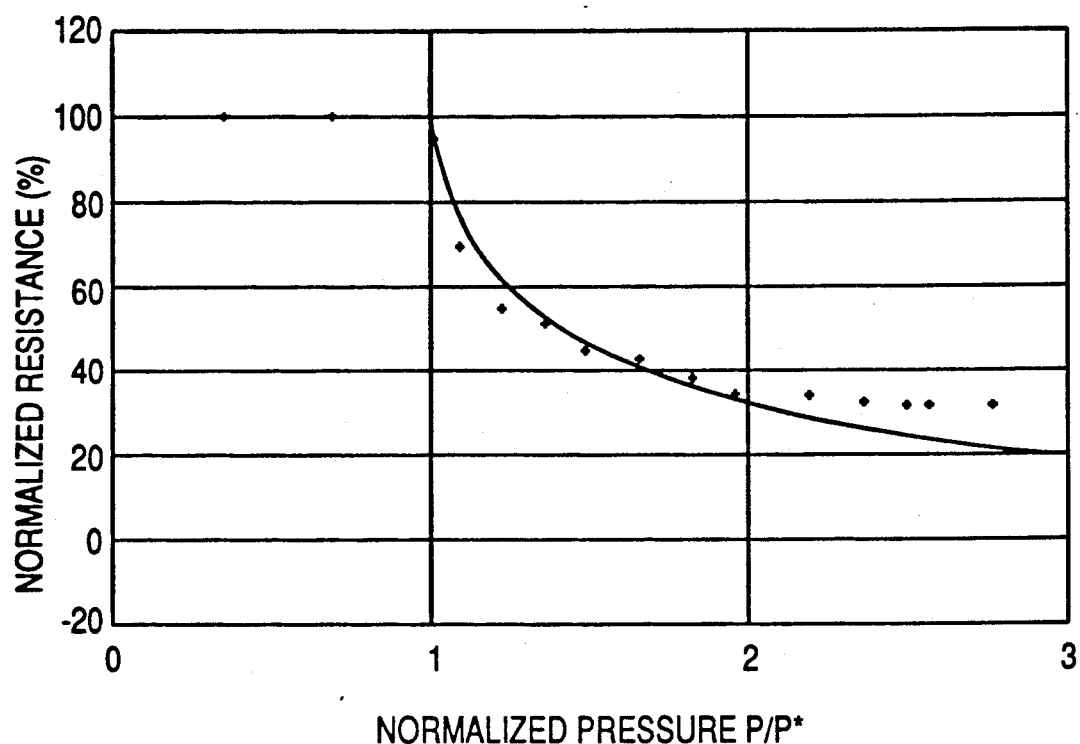
FIG. 6 shows the measured response curve of a chip in accordance with the invention.
Figure 7:
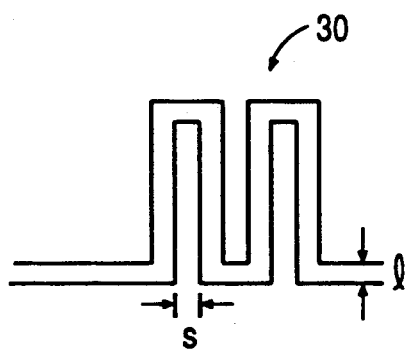
FIG. 7 shows a resistor in accordance with the invention.

FIG. 6 shows the measured response of a sensor chip with a uniform beam and a uniform resistor layout. The plot of the resistance as a function of the pressure is in a normalized form in units of the initial resistance $R(0)$ and the gap pressure $P_g$. The solid line is the calculated response based on a simple beam model. In this example, thin film resistor 30 as shown in FIG. 7 is a rectangular meandering line of aluminum with a linewidth "l" of five microns and a space "s" of five microns between adjacent aluminum portions.

The fabrication of micromachined silicon structures is known in the art and is presented here in summary. Detailed descriptions are provided in "Semiconductor Materials and Process Technology Handbook", by Kenneth E. Bean, Gary E. MacGuire editor, Noyes Publications, 1988, and in "Fabrication of Three-Dimensional Silicon Structures . . . " in "Sensors and Actuators", vol. 16, 1989, pp. 67–82. The silicon substrates have (100)-orientation, and all the features of the mechanical design are aligned to <110>-directions. The wafers are polished on both sides. In the case of the base 10 wafer, there is an epitaxial layer having the thickness of the intended beam thickness.

Processing starts with a thermal oxidation of the silicon wafers. For the cover 20 wafer, a first masking step opens up the silicon oxide layer over the cavity area 23. Cavity 23 is then etched to a depth necessary for the gap 50, taking into account the thickness of all the layers which will be deposited in the sebsequent processing steps. Then, the oxide is stripped, and the wafer is reoxidized. The thermal oxide is the dielectric for the thin films deposited in the next processing step.

For the cover 20 wafer, the electrode material is deposited (preferably by sputtering), first an adhesion layer (e.g. Ti-W), then the contact layer (e.g. Au). Layer thicknesses are typically 1000 and 5000 Angstrom, respectively. The following masking step defines electrode area 40. The deposition for the base 10 wafer is very similar. Sputter deposition of the resistive material is followed by an adhesion/barrier metal (e.g. Ti-W) and the interconnect metal (e.g. Au), all in the same pumpdown. The proper choice of the resistive material is discussed below. Two masking steps then define metal interconnect 33 and resistor 30. If necessary, a high temperature annealing step for resistor 30 follows. This completes the frontside processing of the two wafers. This completes the frontside processing of the two wafers. In another embodiment, resistor is conventionally formed by diffusion or ion implantation in base wafer 10 with contact areas added by surface metallization.

The following describes the deposition of protection layers for the subsequent silicon etching. In the case of the cover 20 wafer, a layer of silicon nitride is deposited by plasma deposition onto the side with electrode 40. For the base 10 wafer, a metal layer (e.g. Cr) is deposited on the frontside. This metal layer is masked to define recess area 13 and then covered by the plasma deposition of a layer of silicon nitride.

The wafers are now ready for the micromachining by an anisotropic silicon etchant (e.g. EDPW or KOH). First, the areas are masked on the backside of the wafers, defining cavity 11 for the base 10 wafer and windows 21 and 22 for the cover 20 wafer. Etching of the base 10 wafer is a two step process, first a deep cavity etch, then an electrochemical etch with an etch stop at the interface between the substrate and the epitaxial layer. For the cover 20 wafer, the cavity etch breaks through the wafer. The plasma nitride protection layers are now removed. This completes the micromachining of the cover 20 wafer. For the base 10 wafer, reactive ion etching (RIE) is now used to etch the recess areas, which are already masked by the chromium layer. Finally the chromium layer is removed.

At this point, base 10 and cover 20 wafers are ready for the bonding operation. Several methods are known in the art for the bonding of two silicon wafers (e.g. metal diffusion, metal-silicon eutectic, glass frit). As an example, the technique of a conventional gold-silicon eutectic bond is described here. In this case, the bonding metal (Au) is already defined on base wafer 10 as part of the metal mask. On cover wafer 20, the silicon oxide is now removed from the bonding area. Base 10 and cover 20 wafers are aligned, clamped together and alloyed at a temperature of 400° C., typically. Finally, a sawing operation separates the bonded wafers into individual chips.

The configuration of thin film resistor 30 is determined by the application. Typically, the material is selected based on the specified temperature coefficient of resistance (TCR). Then resistivity values, current densities and heat dissipation set limits for the resistor layout on a chip of acceptable size. Examples of low TCR resistor materials include nickel/chromium and copper/nickel alloys. It is an option to omit the deposition of a separate resistive material completely and use a meandering line of the interconnect metallization for the resistor. This approach was used for the chip of FIG. 6.

The above description of the invention is illustrative and not limiting. Further embodiments of the invention will be apparent to one of ordinary skill in the art in the light of the disclosure and appended claims.

We claim:

1. A force sensor having an elastic beam and comprising:
   a first surface and a second surface separated by a gap and each said surface being formed in a silicon substrate, the first surface capable of flexing in response to an external force, the second surface stationary relative to the first surface and acting as a deflection stop;
   a resistor formed on one of the surfaces and having two terminals with a current path between the two terminals; and an electrode on the other surface acting as a shunt for that portion of the resistor which comes into contact with said electrode, wherein one of the surfaces includes a central beam located on a diaphragm, said central beam being at least about four times thicker than adjacent portions of said diaphragm; whereby when flexing of the first surface occurs, a resistance in the current path between said two terminals changes in response to said external force.

2. A silicon pressure sensor having an elastic beam and comprising:

a first silicon chip in which is formed a diaphragm capable of flexing in response to pressure changes;

a second silicon chip separated by a gap from said diaphragm and bonded to said first chip;

a resistor formed between two terminals on a surface of said first chip facing said gap wherein said diaphragm includes a beam portion clamped at both ends and located at a central portion of said diaphragm, and said beam portion being at least about four times thicker than a remainder of said diaphragm, said resistor being formed on a surface of said beam portion; and a conductive electrode formed on a surface of the second chip facing said gap;

whereby, in response to pressure changes, the two surfaces make contact of a varying length and a resistance between said two terminals changes in response to pressure.

3. The device of claim 2, wherein said resistor is a meandering conductive line.

4. The device of claim 2, wherein said resistor is a thin metal film.

5. The device of claim 2, wherein said resistor is an area deposited resistive material.

6. The device of claim 2, wherein said resistor comprises a doped region formed in one of said semiconductor bodies.

7. The device of claim 2, wherein said gap is hermetically sealed and evacuated, and thereby the device is sensitive to pressure changes at zero external pressure.

8. The device of claim 2, wherein said resistor is a zig-zag line.

9. The device of claim 2, wherein the sensor has a length of about 3.5 mm and a width of about 2 mm.

* * * * *